US 6,855,800 B2

(12) United States Patent
Senninger

(10) Patent No.: US 6,855,800 B2
(45) Date of Patent: Feb. 15, 2005

(54) METHOD FOR TRAPPING A RESIDUAL MONOMER WITH EPOXIDE FUNCTION IN A THERMOPLASTIC COMPOSITION

(75) Inventor: Thierry Senninger, Hayange (FR)

(73) Assignee: ARKEMA, Puteaux (FR)

( * ) Notice: Subject to any disclaimer, the term of this patent is extended or adjusted under 35 U.S.C. 154(b) by 110 days.

(21) Appl. No.: 10/239,220

(22) PCT Filed: Jan. 22, 2002

(86) PCT No.: PCT/FR02/00246

§ 371 (c)(1),
(2), (4) Date: Sep. 20, 2002

(87) PCT Pub. No.: WO02/059162

PCT Pub. Date: Aug. 1, 2002

(65) Prior Publication Data

US 2003/0139538 A1 Jul. 24, 2003

(30) Foreign Application Priority Data

Jan. 23, 2001 (FR) .............................. 01 00885

(51) Int. Cl.$^7$ .................................. C08F 6/28
(52) U.S. Cl. ...................... 528/482; 528/490; 524/450; 524/502; 525/407
(58) Field of Search ................. 528/482, 490; 524/450, 502; 525/407

(56) References Cited

U.S. PATENT DOCUMENTS

| 3,534,009 A | * | 10/1970 | Beresniewicz et al. ....... 526/73 |
| 3,957,920 A | * | 5/1976 | Kleiner et al. .............. 525/219 |
| 4,910,295 A | * | 3/1990 | Bernier et al. .............. 528/482 |
| 5,420,201 A | * | 5/1995 | Abe et al. .................... 525/74 |
| 5,502,158 A | * | 3/1996 | Sinclair et al. ............. 528/354 |
| 5,552,515 A | * | 9/1996 | Hubbs et al. ................ 528/354 |
| 6,562,907 B2 | * | 5/2003 | Johoji et al. ................ 525/191 |

FOREIGN PATENT DOCUMENTS

| EP | 0650977 A1 | * | 5/1995 |
| EP | 0664317 A1 | * | 7/1995 |
| EP | 0 664 317 A | | 7/1995 |
| JP | 56-112983 A | * | 9/1981 |
| WO | WO 92/13899 | * | 8/1992 |
| WO | WO-92/13899 A | * | 8/1992 |
| WO | WO 92 13899 A | | 8/1992 |
| WO | WO 98 25974 A | | 6/1998 |
| WO | WO-98/25974 A | * | 6/1998 |
| WO | WO-02/059162 A3 | * | 8/2002 |

OTHER PUBLICATIONS

Patent Abstracts of Japan, vol. 005, No. 188, Nov. 27, 1981, & JP 56 112983A—Toagosei Chem. Ind. Co., Ltd.; Sep. 5, 1981.

* cited by examiner

Primary Examiner—David W. Wu
Assistant Examiner—Henry S Hu
(74) Attorney, Agent, or Firm—Millen, White, Zelano & Branigan, P.C.

(57) ABSTRACT

For trapping a residual monomer containing an expoxide function that has not reacted by copolymerization or by grafting, in a thermoplastic composition based on a copolymer of ethylene and/or propylene, a sufficient amount of an acidic trapping additive is added to remove the residual monomer. The trapping additive is preferably a porous zeolite with a pore diameter of between 2 and 10 angstroms. Improved compositions and blends are thereby obtained.

40 Claims, No Drawings

METHOD FOR TRAPPING A RESIDUAL MONOMER WITH EPOXIDE FUNCTION IN A THERMOPLASTIC COMPOSITION

The invention relates to a treatment of a thermoplastic polymer comprising, in copolymerized form or in grafted form, a monomer containing an epoxide function and comprising some of the said monomer containing an epoxide function in free form, also known as residual monomer, that is to say monomer that has not reacted by copolymerization or by grafting. The treatment is intended to uptake the said residual monomer. The invention also relates to compositions and blends comprising such thermoplastic polymers obtained by the said treatment.

Several techniques are already well known in the industry for reducing the content of residual compounds in polymers. A degassing operation can, for example, be performed in degassing silos fed with hot air or nitrogen. The removal of the residual compounds may also be performed in the melt in devices known as devolatilizers, as is the case in the manufacture of polystyrene. In this case, the polymer melt is dispersed in a chamber maintained under high vacuum, the volatiles thus being entrained by the effect of the vacuum. The devolatilization may also be performed in an extruder equipped with one or more degassing wells.

Document WO 98/25974 relates to a composition comprising an acid-based ethylene copolymer, such as ethylene/(meth)acrylic acid. This copolymer is mixed with a hydrophilic zeolite (zeolite with an $SiO_2/Al_2O_3$ ratio of less than 100, preferably less than 35 and advantageously less than 3, absorbing more than 10% of water at 25° C. under a pressure of 4.6 torr) so as to form a composition whose content of residual monomer acid, that has not copolymerized and that is in the polymer, is reduced. In the said document, no mention is made of a monomer containing an epoxide function, or of the colour of the copolymer plus zeolite composition.

Document WO 92/13029 relates to a process for removing substances that generate tastes and odours in plastics. The molecules responsible for these unpleasant effects are not disclosed. Tests conducted with hydrophilic zeolites Sylosiv® 3A and 10A produce a weak effect as regards the removal of the substances responsible for the tastes/odours, whereas the Abscent® hydrophobic zeolites give good results. No mention is made in the said document of a monomer containing an epoxide function. Furthermore, it is difficult to link a level of odour to the content of odoriferous compound. Finally, nothing is stated in the said document regarding the exact content (in ppm) of the residual compounds.

Document WO 92/13899 relates to a process for removing substances that generate tastes and odours in polyolefins. The molecules responsible for these unpleasant effects are not disclosed. Hydrophobic zeolites (zeolite with an $SiO_2/Al_2O_3$ ratio of greater than 17 and preferably greater than 100; absorbing less than 10% water at 25° C. under a pressure of 4.6 torr) are preferred. They are added directly to the polymerization reactor. No mention is made of a monomer containing an epoxide function.

Certain compounds, among which is glycidyl methacrylate (GMA), are suspected of having a toxicological action even in trace amount. The international legislation is tending towards becoming stricter as regards the content of residual compounds in polymers. The production of polymers comprising minute or even zero amounts of residual compounds is thus proving to be an important factor.

Although the degassing technique is entirely inefficient on polymer granules, the melt devolatilization technique is more effective, but does not allow the amount of residual compounds to be significantly reduced. Furthermore, the solution consisting in planting a device of the type such as a devolatilizer under vacuum is a solution that demands a large investment.

The invention is directed towards providing a technically simple, inexpensive and non-toxic means for obtaining polymers based on ethylene and/or propylene and on monomer(s) containing an epoxide function comprising little or none of the said residual monomer containing an epoxide function. The invention consists in taking up this free monomer using a "trap" that is adapted to its chemical nature, such as an acidic solid or an organic acid, without altering the coloration of the thermoplastic polymer.

In the case where the polymers are used in the composition of a food packaging (for example a film, tray or bottle), the chemical and/or physical uptake of the residual compound can prevent the direct contact of the said compound with the food. Even when the polymer is diluted in a composition so as to produce a packaging of high thickness (>5 mm), the residual compound can migrate into the composition to come into contact with the food. This is also the case when the polymer is used in the manufacture of multi-layer films. The addition of an acidic compound as recommended by the invention can thus prevent the taste of the food from being impaired by the residual compound. Furthermore, this uptake can possibly also lead to better olfactory comfort.

In the manufacture of a composition in which the thermoplastic polymer is used, it is also important that the acidic compound should not alter the physical properties of the thermoplastic polymer. In particular, the optical properties of the polymer are very important, such as, for example, the transparency or the colour.

The thermoplastic compositions according to the invention or mixtures comprising such compositions are used to manufacture articles such as, for example, food trays, wrapping films, bottles and tubes, inter alia, that are intended to come into contact with foods in solid or liquid form.

The invention relates to a process for trapping a residual monomer that has not reacted by copolymerization or by grafting, comprising at least one epoxide function, in a thermoplastic composition based on a copolymer of ethylene and/or propylene and of at least one monomer comprising at least one epoxide function, the said process comprising the following steps:

preparation of the said thermoplastic composition, addition of a sufficient amount of a trapping additive that is acidic in the Lewis or Brönsted sense of the said residual monomer.

According to one embodiment of the process, the trapping additive is an acidic organic compound and/or a solid mineral compound having at its surface sites of an acidic nature in the Lewis or Brönsted sense.

According to one embodiment of the process, the mineral acidic compound is selected from alumina, silica, silicoaluminates and zeolites of general formula $M_{2/n}O.Al_2O_3.y SiO_2.w H_2O$ with:

M denoting a cation of valency n which may be Na, K, Mg, Ca or H;

y being greater than or equal to 2;

w denoting the number of moles of water retained in the zeolite.

According to one embodiment of the process, the zeolites are porous structures with a pore diameter of between 2 and 10 angstroms.

According to one embodiment of the process, the zeolites have an $SiO_2/Al_2O_3$ ratio of between 20 and 10,000 and preferably between 20 and 500.

According to one embodiment of the process, the zeolites are hydrophobic, absorbing less than 10% water at 25° C. under a pressure of 4.6 torr.

The amount of water adsorbed at the surface of the zeolite may range between 0 and 2% by weight. By way of example, mention may be made of the zeolites sold by PQ Corporation under the names CBV 3020®, 5020®, 8020® or 1502®.

According to one embodiment of the process, the trapping additive is an organic acid, such as acrylic acid, methacrylic acid, stearic acid, sebacic acid, undecanoic acid, palmitic acid, propanoic acid or butanoic acid.

According to one embodiment of the process, the thermoplastic composition comprises:
- 50% to 95% by weight of ethylene and/or propylene,
- 0% to 40% by weight of alkyl (meth)acrylate or of vinyl acetate,
- 0.1% to 15% by weight of grafted or copolymerized monomer, comprising at least one epoxide function.

According to one embodiment of the process, the thermoplastic composition comprises:
- 50% to 95% by weight of ethylene
- 0% to 40% by weight of methyl (meth)acrylate,
- 0.1% to 15% by weight of grafted or copolymerized glycidyl methacrylate.

According to one embodiment of the process, the trapping additive is partially or totally added to the thermoplastic composition in the form of a masterbatch.

According to one embodiment of the process, the masterbatch comprises 20% to 80% by weight of a polymer constituting the base of the said masterbatch and 80% to 20% by weight of the trapping additive.

According to one embodiment of the process, the base of the masterbatch is chosen from the following group of polymers: high density polyethylene, low density polyethylene, polyethylene obtained by metallocene catalysis, polypropylene, ethylene/vinyl acetate copolymer and ethylene/alkyl (meth)acrylate copolymers.

The invention also relates to a thermoplastic composition comprising:
- a polymer based on ethylene and/or propylene and based on at least one monomer comprising at least one epoxide function, and
- an additive for trapping a residual monomer comprising at least one epoxide function that has not polymerized or that has not been grafted in the said thermoplastic composition;
- a residual monomer comprising at least one epoxide function that has not polymerized or that has not been grafted in the said thermoplastic composition, in a content of between 2000 and 0 ppm.

According to one embodiment of the composition, the polymer comprises:
- 50% to 95% by weight of ethylene and/or propylene,
- 0% to 40% by weight of alkyl (meth)acrylate or of vinyl acetate,
- 0.1% to 15% by weight of grafted or copolymerized monomer, comprising at least one epoxide function.

According to one embodiment of the composition, the polymer comprises:
- 50% to 95% by weight of ethylene,
- 0% to 40% by weight of methyl (meth)acrylate,
- 0.1% to 15% by weight of grafted or copolymerized glycidyl methacrylate.

According to one embodiment of the composition, the trapping additive is an acidic organic compound and/or a solid mineral compound having at its surface sites of an acidic nature in the Lewis or Brönsted sense.

According to one embodiment of the composition, the mineral acidic compound is selected from alumina, silica, silicoaluminates and zeolites of general formula $M_{2/n}O.Al_2O_3.y\ SiO_2.w\ H_2O$ with:
- M denoting a cation of valency n which may be Na, K, Mg, Ca or H;
- y being greater than or equal to 2;
- w denoting the number of moles of water retained in the zeolite.

According to one embodiment of the composition, the trapping additive is a porous zeolite with a pore diameter of between 2 and 10 angstroms.

According to one embodiment of the composition, the zeolite has an $SiO_2/Al_2O_3$ ratio of between 20 and 10,000 and preferably between 20 and 500.

According to one embodiment of the composition, the zeolite is hydrophobic, absorbing less than 10% water at 25° C. under a pressure of 4.6 torr.

According to one embodiment of the composition, the trapping additive is introduced therein in the form of a masterbatch comprising 20% to 80% by weight of a copolymer taken from the group comprising high density polyethylene, low density polyethylene, polyethylene obtained by metallocene catalysis, polypropylene, ethylene/vinyl acetate copolymer and ethylene/alkyl (meth)acrylate copolymers and 80% to 20% by weight of the said trapping additive.

According to one embodiment of the composition, it comprises a content of residual monomer comprising at least one epoxide function, preferably of between 1000 and 0 ppm, between 150 and 0 ppm, between 100 and 0 ppm, between 50 and 0 ppm or between 5 and 0 ppm.

The invention also relates to a blend comprising a thermoplastic composition as described above and a polyester.

According to one embodiment of the blend, the polyester is polyethylene terephthalate (PET) or polybutylene terephthalate (PBT), or a blend thereof.

The invention relates to the use of the blend as described above to manufacture articles.

We will now describe a process for reducing the amount of free monomers containing an epoxide function in thermoplastic polymers. The general principle of this process consists in adding to a polymer melt, prepared according to a method known to those skilled in the art, an additive capable of interacting with the residual monomer containing an epoxide function. Without engaging in a very detailed explanation of the phenomenon involved, the additive is capable of taking up the residual compound in cages and/or channels of calibrated sizes and/or of chemically trapping it by reaction between the acid function and the epoxide function. The term "trapping additive" or "trapping agent" will be used hereinbelow. The trapping is measured after the treatment by analyses known to those skilled in the art. An analysis by gas chromatography was especially used in our case. Hereinbelow, the term "residual compound" will mean any chemical compound that is detected in the thermoplastic composition following analyses of this type, in particular after the analytical operation consisting in dissolving the polymer in a solvent and then in precipitating it from a non-solvent containing an internal standard.

A thermoplastic composition according to the invention comprises a polymer based on ethylene and/or based on propylene and an additive for trapping a residual monomer containing an epoxide function that has not reacted by copolymerization or by grafting.

As regards trapping additives, mention may be made of any solid having at its surface sites of an acidic nature in the Lewis or Brönsted sense. Mention may be made, for example, of hydrophobic zeolites with an $SiO_2/Al_2O_3$ ratio of between 20 and 10,000 and preferably between 20 and 500. Zeolites have a porous structure with pore diameters of between 2 and 10 angstroms. Zeolites have the capacity of absorbing less than 10% water at 25° C. and at a pressure of 4.6 torr. Examples which may be mentioned include the zeolite sold by PQ Corporation under the name ZSM 5 5020 50B.

As regards the monomer containing an epoxide function, mention may be made, for example, of:

aliphatic glycidyl esters and ethers, such as allyl glycidyl ether, vinyl glycidyl ether, glycidyl maleate and itaconate, glycidyl (meth)acrylate, and alicyclic glycidyl esters and ethers, such as 2-cyclohexene-1-glycidyl ether, cyclohexene-4,5-diglycidyl carboxylate, cyclohexene-4-glycidyl carboxylate, 5-norbornene-2-methyl-2-glycidyl carboxylate and endo-cis-bicyclo(2.2.1)-5-heptene-2,3-diglycidyl dicarboxylate.

As regards the polymer based on ethylene and/or propylene, it may be chosen from the following two families of polymers:

1) ethylene-based copolymers obtained by a free-radical polymerization mechanism at high pressure, as described, for example, in the following documents: U.S. Pat. Nos. 2,200,429; 2,953,551; 3,350,372; 3,756,996. These copolymers may contain:

50% to 95% by weight of ethylene;

0% to 40% by weight of alkyl (meth)acrylate or of vinyl acetate;

0.1% to 15% by weight of monomer containing an epoxide function, more particularly glycidyl acrylate or glycidyl methacrylate.

2) thermoplastic polymers based on ethylene or propylene onto which a monomer containing an epoxide function is grafted by means of a free-radical grafting reaction. The grafting operation is well known to those skilled in the art and may be performed in the melt or in solution in an organic solvent. When the grafting reaction takes place in the melt, an extruder is advantageously used to place in contact the thermoplastic polymer, the monomer containing an epoxide function and also the source of free radicals used to initiate the chemical grafting reaction.

The content of monomer containing a grafted epoxide function is between 0.1% and 15% and preferably between 0.1% and 5% by weight.

The thermoplastic polymer based on ethylene and/or propylene onto which is grafted the monomer containing an epoxide function will be chosen from the following polymers:

(a) homopolyethylenes such as, for example:

low density polyethylene (LDPE)

high density polyethylene (HDPE)

linear low density polyethylene (LLDPE)

very low density polyethylene (VLDPE)

polyethylene obtained by metallocene catalysis, that is to say polymers obtained by copolymerization of ethylene and of α-olefin such as propylene, butene, hexene or octene in the presence of a single-site catalyst generally consisting of a zirconium or titanium atom and of two cycloalkyl molecules linked to the metal. More specifically, the metallocene catalysts are usually compounds of two cyclopentadiene rings linked to the metal. These catalysts are frequently used with aluminoxanes as co-catalysts or activators, preferably methylaluminoxane (MAO). Hafnium may also be used as the metal to which the cyclopentadiene is attached. Other metallocenes may include transition metals from groups IVA, VA and VIA. Metals of the lanthanide series may also be used.

b) copolymers comprising ethylene and a comonomer which may be chosen from:

α-olefins, advantageously those containing from 3 to 30 carbon atoms; examples of α-olefins which may be mentioned include propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene, and 1-triacontene; these α-olefins may be used alone or as a mixture of two or more than two, unsaturated carboxylic acid esters such as, for example, alkyl (meth)acrylates, the alkyls possibly containing up to 24 carbon atoms, examples of alkyl acrylates or methacrylates are especially methyl methacrylate, ethyl acrylate, n-butyl acrylate, isobutyl acrylate and 2-ethylhexyl acrylate, vinyl esters of saturated carboxylic acids such as, for example, vinyl acetate or propionate, dienes such as, for example, 1,4-hexadiene, the polyethylene may comprise several of the above comonomers, c) homopolypropylenes, d) copolymers comprising propylene and a comonomer which may be chosen from:

ethylene dienes such as, for example, 1,4-hexadiene, e) elastomers of the type such as:

EPR (ethylene-propylene-rubber)

EPDM (ethylene-propylene-diene)

or blends of polyethylene with an EPR or an EPDM.

Grafting is an operation that is known per se.

The copolymers of ethylene and of a monomer containing an epoxide function are advantageously ethylene/alkyl (meth)acrylate/monomer containing epoxide function copolymers obtained by copolymerization of the monomers. They contain from 0 to 40% by weight of alkyl (meth)acrylate, preferably from 5% to 35% and up to 15% by weight of monomer containing an epoxide function, and preferably from 0.1% to 10%.

The monomer containing an epoxide function is advantageously glycidyl methacrylate or GMA.

Advantageously, the alkyl (meth)acrylate is chosen from methyl (meth)acrylate, ethyl acrylate, n-butyl acrylate, isobutyl acrylate and 2-ethylhexyl acrylate, and will preferably be butyl acrylate or methyl acrylate. The amount of alkyl (meth)acrylate is advantageously from 20% to 35% by weight. The MFI is advantageously between 5 and 100 (in g/10 min at 190° C. under 2.16 kg) and the melting point is between 60° C. and 110° C.

The additive for trapping free monomers containing an epoxide function in the thermoplastic composition according to the invention may be injected in the form of a pure trapping additive or in the form of a masterbatch. In this case, the masterbatch comprises 20% to 80% (by weight) of a polymer constituting the base of the said masterbatch and 80% to 20% (by weight) of the trapping additive. As polymers constituting the base of the masterbatch, mention may be made of: high density polyethylene (HDPE), low density polyethylene (LDPE), polyethylene obtained by metallocene catalysis, polypropylene, copolymers of ethylene of the type such as ethylene/vinyl acetate (EVA) or ethylene/alkyl (meth)acrylate (such as, for example, the ethylene/methyl acrylate or ethylene/butyl acrylate polymers sold by Atofina under the brand name Lotryl®).

Preferably, when the polymer to be treated is an ethylene/alkyl (meth)acrylate/monomer containing an epoxide function polymer, the masterbatch binder will also be chosen from ethylene copolymers, of the type such as ethylene/vinyl acetate (EVA) or ethylene/alkyl (meth)acrylate. Ethylene/alkyl (meth)acrylate copolymers, especially those of the brand name Lotryl®, will preferably be chosen. As regards the latter copolymers, the MFI will preferably be between 5 and 20 g/10 min at 190° C. under 2.16 kg.

The trapping additive, pure or included in a masterbatch, has the advantage of being able to be introduced directly into the polymer melt by means of a compounding operation in an extruder. It may be injected at any time, before or during the extrusion of the polymer. This results in a great ease of use. The time required for the trapping additive to be able to interact is substantially between 1 second and 10 minutes at a temperature substantially of between 0° C. and 250° C.

The trapping additive, pure or included in a masterbatch, is added in an amount that is sufficient to reduce the amount of free monomer in the polymer. This amount is defined by a person skilled in the art as a function of the desired result, that is to say of the desired percentage of trapping of the free epoxide in the thermoplastic composition according to the invention or the desired final content of residual compound.

By way of example, a polymer comprising between 100 and 1000 ppm of free monomer containing an epoxide function comprises between 0 and 100% of residual monomer after the treatment, given that between 0 and 10% (by weight), preferably between 0 and 5% (by weight) and advantageously between 0 and 2% (by weight) of acidic trapping additive have been added to the said polymer.

We will now describe one embodiment of the invention in greater detail.

Method for Assaying the Residual Compounds in the Copolymer:

For the Comparative Examples 1–4, 8 and 9 and Examples 5–7, the method used for assaying the residual compounds is as follows. 2 g of polymer sample are weighed out in a leaktight flask and are dissolved in tetrahydrofuran without heating, and the solution obtained is then heated at 50° C. for 10 minutes. The polymer is then precipitated using a solution of methanol containing nonane as internal standard. The supernatant liquid is then injected into the chromatograph.

Conditions of the gas chromatography (GC): helium as carrier gas, split as injection mould, BPX5 as column type, 5 m as column length, 0.32 mm as column diameter, 0.5 µm as phase thickness, 1 µl as injected volume, FID as detector, 50° C. (6 min) and then increase from 50 to 260° C. at 10° C./min as oven program.

The various tests and comparative examples which follow were performed with Lotader® AX8900 (terpolymer comprising ethylene/methyl acrylate/glycidyl methacrylate (GMA)) sold by Atofina or, for Comparative Example 9, with Lacqrène® 1450N polystyrene sold by Atofina.

The various batches of Lotader® AX8900 that we used comprise between 50 and 1000 ppm by weight of free GMA.

COMPARATIVE EXAMPLE 1

In order to demonstrate the free GMA, a crucible containing granules of Lotader® AX8900 is placed in a glass tube flushed with a stream of nitrogen (20 ml/min).

The glass tube is heated for several hours (0, 4 and 8 hours) at 50° C. and the stream of gas is trapped in water. The content of residual GMA in the Lotader® AX8900 found in the crucible is then determined by GC according to the method described above. The results are given in Table 1.

TABLE 1

| Time (in hours) | Concentration of free GMA in the copolymer (in ppm) | % by weight of free GMA released |
| --- | --- | --- |
| 0 | 325 | 0 |
| 4 | 250 | 23 |
| 8 | 145 | 55 |

The "residual" or "free" GMA in the copolymer corresponds to the GMA monomer that has not copolymerized and that remains included in the copolymer mass at ambient temperature. As shown in Table 1, at a constant temperature (50° C.), the percentage of GMA released increases as a function of time. After 8 hours, about half of the residual GMA is released.

It is found that the residual GMA included in Lotader® AX8900 granules degasses at a constant temperature of 50° C., but slowly over a period of several hours.

COMPARATIVE EXAMPLE 2

A crucible containing Lotader® AX8900 granules comprising 100 ppm of free GMA is placed in a glass tube flushed with a stream of nitrogen (20 ml/min). The glass tube is heated for 24 hours at a constant temperature of 25° C. After 24 hours, the granules no longer have a perceptible odour of GMA. However, the assay of the free GMA in the copolymer reveals that 70 ppm of free GMA remains in the copolymer.

It is thus found, even in the absence of an odour of GMA, the copolymer may still contain free GMA in an appreciable amount. It is consequently difficult to link a level of odour to a content of any particular residual compound.

COMPARATIVE EXAMPLE 3

The copolymer Lotader® AX8900 (composition described above) is extruded using a Fairex® 45/26D extruder at a screw speed=40 rpm, according to the following extrusion conditions. The extruder is defined in five zones ranging from zone 1 to zone 5. Zone 5 is the closest to the extruder die, whereas zone 1 is the zone that is furthest from the die. In the case where the zone temperatures T are as follows: T zone 1=177° C., T zone 2=196° C., T zone 3=199° C., T zone 4=200° C., T zone 5=201° C., T die=191° C., it is found, after analysis by GC and according to the assay method defined above, that the copolymer entering zone 1 has an initial content of residual GMA of about 177 ppm and a content of residual GMA at the die outlet of about 175 ppm.

Extrusion alone of the copolymer does not make it possible to significantly remove the residual GMA in the Lotader® AX8900.

Measurements made it possible to show that this is likewise the case for methyl acrylate: extrusion alone of the copolymer does not make it possible to significantly remove the residual methyl acrylate.

COMPARATIVE EXAMPLE 4

The same extruder and the same extrusion conditions as those described in Comparative Example 3 are used. The difference between Comparative Example 4 and Comparative Example 3 lies in the coextrusion of the Lotader® AX8900 copolymer and of 2.4% by weight of an acidic copolymer Lucalen® A 3110 M (ethylene/butyl acrylate/ acrylic acid copolymer) sold by Elenac.

It is found, after analysis by GC and according to the assay method defined above, that the copolymer entering zone 1 of the extruder has an initial content of residual GMA of 177 ppm and a content of residual GMA at the die outlet of 171 ppm. The reduction in the GMA content is thus not large, since the acid function linked to the copolymer is possibly not free enough, as that of an organic acid may be.

EXAMPLE 5

Example 5 illustrates the invention. The same extruder and the same extrusion conditions as those described in Comparative Example 3 are used. The difference between Example 5 and Comparative Example 3 lies in the injection into the extruder, during the extrusion of the Lotader® AX8900 copolymer, of 1% by weight of acidic zeolite ZSM 5 5020 50B® from PQ Corporation (particles of 0.1 to 0.5 micrometers, specific surface of 440 m$^2$/g, SiO$_2$/Al$_2$O$_3$ molar ratio=50 and Na$_2$O content=0.02% by weight), the copolymer Lotader® AX8900 and the zeolite thus being co-extruded.

It is found, after analysis by GC and according to the assay method defined above, that the copolymer entering zone 1 of the extruder has an initial content of residual GMA of 177 ppm and an initial content of methyl acrylate of 80 ppm.

The content of residual GMA at the die outlet is undetectable since it is too minute (between about 0 and 5 ppm). The content of residual methyl acrylate at the die outlet is 75 ppm.

Furthermore, an analysis by $^1$H NMR (solvent: o-dichlorobenzene-d$_4$, 80° C.) of the copolymer derived from the extrusion in Example 5 made it possible to show that the content of copolymerized GMA is not affected by the treatment. Specifically, its content of copolymerized GMA is about 8% before extrusion and equal to about 8% after extrusion.

EXAMPLE 6

Example 6 illustrates the invention. The same extruder and the same extrusion conditions as those described in Comparative Example 3 are used. The difference between Example 6 and Comparative Example 3 lies in the injection into the extruder, during the extrusion of the copolymer Lotader® AX8900, of 0.5% by weight of acidic zeolite ZSM 5 5020 50B® from PQ Corporation (particles of 0.1 to 0.5 micrometers, specific surface of 440 m$^2$/g, SiO$_2$/Al$_2$O$_3$ molar ratio=50 and Na$_2$O content=0.02% by weight), the copolymer Lotader® AX8900 and the zeolite thus being co-extruded.

It is found, after analysis by GC and according to the assay method defined above, that the copolymer entering zone 1 of the extruder has an initial content of residual GMA of 177 ppm and an initial content of methyl acrylate of 80 ppm.

The content of residual GMA at the die outlet is undetectable since it is too minute (between about 0 and 5 ppm). The content of residual methyl acrylate at the die outlet is 80 ppm.

Based on the comparative tests 1 and 2 and on Examples 5 and 6, it was not at all obvious that:
  relative to a degassing process under nitrogen, the introduction of a trapping additive can have such an effective action both in terms of reducing the level of GMA and of the speed of disappearance of the GMA;
  the addition of acidic zeolite can have such a remarkable effect on the content of free GMA, without influencing the content of copolymerized GMA;
  the acidic zeolite has an effect on the content of free GMA but little or no effect on the content of free methyl acrylate.

EXAMPLE 7

Example 7 illustrates the invention. The same extruder and the same extrusion conditions as those described in Comparative Example 3 are used. The difference between Example 7 and Comparative Example 3 lies in the injection into the extruder, during the extrusion of the copolymer Lotader® AX8900, of 0.1% by weight of stearic acid, the copolymer Lotader® AX8900 and the stearic acid thus being co-extruded.

It is found, after GC analysis, that the copolymer entering zone 1 of the extruder has an initial content of residual GMA of 177 ppm and a content of residual GMA at the die outlet of 148 ppm.

A reduction in the level of the residual GMA in the copolymer by virtue of the introduction of a minute amount of organic acid is found.

COMPARATIVE EXAMPLE 8

The same test as in Example 5 is performed, but with 1% of a hydrophilic zeolite, Sylosiv 4A, instead of a hydrophobic zeolite ZSM. This zeolite Sylosiv 4A is sold by W. R. Grace & Co., micronized and highly porous, with a mean pore diameter of 4 angstroms. The pH of this zeolite at 5% in water, measured according to the method of DIN EN ISO 787-9, is 11.5. The copolymer Lotader® AX8900 and the zeolite are co-extruded.

It is found, after analysis by GC and according to the assay method defined above, that the copolymer entering zone 1 of the extruder has an initial content of free GMA of 55 ppm and a content of free GMA at the die outlet of 55 ppm.

This example underlines the influence of the chemical nature of the zeolite used.

COMPARATIVE EXAMPLE 9

The same test as in Example 5 is performed but with Lacqrène® 1450N polystyrene as polymer. The method for assaying the styrene monomer is identical to that used to assay GMA.

It is found, after analysis by GC, that the polymer entering zone 1 of the extruder has an initial content of free styrene of 250 ppm and a content of free styrene at the die outlet of 250 ppm. The zeolite therefore has no effect on the removal of the residual styrene.

This example shows that a zeolite may be detected for one residual compound (GMA) but not necessarily for another (styrene). The trapping function is therefore not transposable from one resin to another and thus from one residual compound to another.

Table 2 below summarizes the percentage of residual or free monomer remaining in the polymer after treatment of the polymer.

TABLE 2

| Test | Polymer treatment method | % of monomer remaining in the polymer after treatment |
|---|---|---|
| Comparative 1 | Degassing at 50° C. for 8 hours | 45% (GMA) |
| Comparative 2 | Degassing at 25° C. for 24 hours | 70% (GMA) |
| Comparative 3 | Extrusion alone | 99% (GMA) |
| Comparative 4 | Extrusion with acidic copolymer | 97% (GMA) |
| Example 5 | Extrusion with 1% hydrophobic zeolite ZSM | 0% (GMA) |
| Example 6 | Extrusion with 0.5% hydrophobic zeolite ZSM | 0% (GMA) |
| Example 7 | Extrusion with 0.1% stearic acid | 83% (GMA) |
| Comparative 8 | Extrusion with hydrophilic zeolite Sylosiv 4A | 100% (GMA) |
| Comparative 9 | Extrusion of the PS with hydrophobic zeolite ZSM | 100% (styrene) |

The proportion of residual or free GMA released depends mainly on the reaction temperature, the reaction time, the pressure, the amount of free GMA to be trapped and the amount of trapping additive introduced into the copolymer. As regards this final point, the more trapping additive that is added, the more the free GMA will be trapped in the copolymer, until a plateau is reached at which adding further trapping additive will make no difference since all the free GMA will have been trapped out.

In the light of these examples and comparative examples, our invention makes it possible to:
  reduce the content of residual GMA without affecting the content of copolymerized GMA,
  provide a trapping agent that is effective on a monomer comprising a given chemical function and not on another monomer not comprising this same chemical function,
  provide a trapping agent that is effective on one monomer of a certain chemical family but not as effective on another monomer of the same chemical family, such as acrylates,
  show that it was not at all obvious to find a suitable additive capable of reducing the content of residual GMA to the point that it becomes undetectable by the analytical technique used.

What is claimed is:

1. A process for trapping an unreacted residual monomer comprising at least one epoxide function, in a thermoplastic composition comprising a copolymer of ethylene and/or propylene with at least one monomer comprising at least one epoxide function, said process comprising the following steps:
  preparing a melt of said thermoplastic composition comprising said unreacted residual monomer comprising an epoxide function,
  adding to said melt a sufficient amount of a trapping additive having Lewis or Brönsted acid sites so as to trap said unreacted residual monomer.

2. A process according to claim 1, wherein the trapping additive comprises at least one of an acidic organic compound and a solid mineral compound having acidic surface sites.

3. A process according to claim 2, wherein the trapping additive is a mineral acidic compound is selected from the group consisting of alumina, silica, silicoaluminates and zeolites of general formula $M_{2/n}O.Al_2O_3.y\ SiO_2.H_2O$ with:
  M denoting a cation selected from the group consisting of Na, K, Mg, Ca, and H;
  y being greater than or equal to 2;
  w denoting the number of moles of water retained in the zeolite.

4. A process according to claim 3, wherein the trapping agent comprises said zeolites, the latter being porous structures with a pore diameter of between 2 and 10 angstroms.

5. A process according to claim 3 wherein the zeolites have an $SiO_2/Al_2O_3$ ratio of between 20 and 10,000.

6. A process according to claim 4 wherein the zeolites are hydrophobic, absorbing less than 10% water at 250° C. under a pressure of 4.6 torr.

7. A process according to claim 2, wherein the trapping additive comprises an organic acid.

8. A process according to claim 7 wherein the organic acid comprises at least one acid selected from the group consisting of acrylic acid, methacrylic acid, stearic acid, sebacic acid, undeconoic acid, palmitic acid, proanoic acid and butanoic acid.

9. A process according to claim 1 wherein the thermoplastic composition comprises a polymer produced from:
  50% to 95% by weight of ethylene and/or propylene,
  0% to 40% by weight of alkyl (meth)acrylate or of vinyl acetate, and
  0.1% to 15% by weight of grafted or copolymerized monomer, comprising of at least one epoxide function.

10. A process according to claim 9, wherein the polymer is produced from:
  50% to 95% by weight of ethylene,
  0% to 40% be weight of methyl (meth)acrylate, and
  0.1% to 15% be weight of grafted or copolymerized glycidyl methacrylate.

11. A process according to claim 1, comprising adding the trapping additive is partially or totally to the copolymer in the form of a masterbatch.

12. A process according to claim 11, wherein the masterbatch comprises 20% to 80% by weight of a polymer constituting the base of the said masterbatch and 80% to 20% be weight of the trapping additive.

13. A process according to claim 12, wherein the polymer constituting the base of the masterbatch is chosen from the group consisting of high density polyethylene, low density polyethylene, polyethylene obtained by metallocene catalysis, polypropylene, a copolymer based on ethylene and vinyl acetate and an ethylene/alkyl (meth)acrylate copolymer.

14. A process according to claim 1, wherein the trapping agent is added to the melt during extrusion of said thermoplastic compositions.

15. A process according to claim 1, wherein the residual monomer is glycidyl (meth)acrylate.

16. A process according to claim 14, wherein the residual monomer is glycidyl (meth)acrylate.

17. A process according to claim 1, wherein the trapping agent is a hydrophobic zeolite.

18. A process according to claim 16, wherein the trapping agent is a hydrophobic zeolite.

19. A process according to claim 1, wherein said thermoplastic composition is based solely on said copolymer and no other polymer or copolymer.

20. A thermoplastic composition as obtained according to the process of claim 1, comprising:

a polymer based on ethylene and/or propylene and based on at least one monomer comprising at least one epoxide function, and an additive having Lewis or Brönsted acid sites for trapping a residual monomer comprising at least one epoxide function that has not polymerized or that has not been grafted in that said thermoplastic composition;

a residual monomer comprising at least one epoxide function that has not polymerized or that has not been grafted in the said thermoplastic composition, in a content of between 2000 and 0 ppm.

21. A thermoplastic composition according to claim 20, wherein the polymer is produced from:

50% to 95% by weight of ethylene and/or propylene,

0% to 40% by weight of alkyl (meth)acrylate or of vinyl acetate, 0.1% to 15% by weight of grafted or copolymerized monomer, comprising at least one epoxide function.

22. A thermoplastic composition according to claim 21, wherein the polymer is produced from:

50% to 95% by weight of ethylene,

0% to 40% by weight of methyl (meth)acrylate, 0.1% to 15% by weight of grafted or copolymerized glycidyl methacrylate.

23. A thermoplastic composition according to claim 20 wherein the trapping additive is an acidic organic compound and/or a solid mineral compound having at its surface sites of an acidic nature in the Lewis or Brönsted sense.

24. A thermoplastic composition according to claim 23, comprising a mineral acidic compound selected from the group consisting of alumina, silica, silicoaluminates and zeolites of general formula $M_{2n}O.Al_2O_3.y\ SiO_2.w\ H_2O$ with:

M denoting a cation of valency n which may be Na, K, Mg, Ca, or H;

y being greater than or equal to 2;

w denoting the number of moles of water retained in the zeolite.

25. A thermoplastic composition according to claim 24, comprising zeolites having a pore diameter of between 2 and 10 angstroms.

26. A thermoplastic composition according to claim 25 wherein the zeolites have an $SiO_2/Al_2O_3$ ratio of between 20 and 10,000.

27. A thermoplastic composition according to claim 26 the $SiO_2/Al_2O_3$ ratio is between 20 and 50.

28. A thermoplastic composition according to claim 25 wherein the zeolites are hydrophobic, absorbing less than 10% water at 25° C. under a pressure of 4.6 torr.

29. A thermoplastic composition according to claim 23 in the form of a masterbatch comprising 20% to 80% by weight of a copolymer selected from the group consisting of high density polyethylene, low density polyethylene, polyethylene obtained by metallocene catalysis, polypropylene, ethylene/vinyl acetate copolymer and ethylene/alkyl (meth) acrylate copolymers and 80% to 20% by weight of the said trapping additive.

30. A thermoplastic composition according to claim 20 comprising a content of residual monomer containing at least one epoxide function of between 200 and 0 ppm.

31. A thermoplastic composition according to claim 30, wherein the residual monomer content is between 150 and 0 ppm.

32. A thermoplastic composition according to claim 31, characterized in that it comprises a content of residual monomer of between 100 and 0 ppm.

33. A thermoplastic composition according to claim 32, characterized in that it comprises a content of residual monomer of between 50 and 0 ppm.

34. A thermoplastic composition according to claim 33, characterized in that it comprises a content of residual monomer of between 5 and 0 ppm.

35. A thermoplastic composition prepared by the process of claim 2.

36. A thermoplastic composition prepared by the process of claim 6, said composition containing substantially 0% of said monomer comprising at least one epoxide function.

37. An article of manufacture comprising the thermoplastic composition of claim 36.

38. A blend comprising a thermoplastic composition according to claim 20 and a polyester.

39. A blend according to claim 38, wherein the polyester is polyethylene terephthalate (PET), polybutylene terephthalate (PBT) or a blend thereof.

40. An article of manufacture comprising a blend according to claim 38.

* * * * *

UNITED STATES PATENT AND TRADEMARK OFFICE
CERTIFICATE OF CORRECTION

PATENT NO. : 6,855,800 B2
DATED : February 15, 2005
INVENTOR(S) : Thierry Senninger It is certified that error appears in the above-identified patent and that said Letters Patent is hereby corrected as shown below:

Column 12,
Line 15, reads "water at 250° C." should read -- water at 25° C --.
Line 22, reads "proanoic acid" should read -- propanoic acid --.
Lines 35, 36 and 44, reads "be weight" should read -- by weight --.
Line 34, reads "$M_{2n}O$." should read -- $M_{2/n}O$. --.

Column 14,
Line 2, reads "the $SiO_2/Al_2O_3$" should read -- wherein the $SiO_2/Al_2O_3$ --.

Signed and Sealed this

Fifth Day of July, 2005

JON W. DUDAS
*Director of the United States Patent and Trademark Office*